US008045849B2

(12) United States Patent  (10) Patent No.: US 8,045,849 B2
Zoccolante et al.  (45) Date of Patent: Oct. 25, 2011

(54) WATER TREATMENT SYSTEM AND PROCESS

(75) Inventors: Gary V. Zoccolante, Plymouth, MA (US); Bruce Rothenberg, Walpole, MA (US); Jonathan H. Wood, Needham, MA (US); Joseph D. Gifford, Marlborough, MA (US); Anil D. Jha, Lincoln, MA (US)

(73) Assignee: Siemens Industry, Inc., Alpharetta, GA (US)

( * ) Notice: Subject to any disclaimer, the term of this patent is extended or adjusted under 35 U.S.C. 154(b) by 1232 days.

(21) Appl. No.: 11/444,984

(22) Filed: Jun. 1, 2006

(65) Prior Publication Data

US 2006/0291839 A1 Dec. 28, 2006

Related U.S. Application Data

(60) Provisional application No. 60/686,218, filed on Jun. 1, 2005.

(51) Int. Cl.
*F24H 1/10* (2006.01)
(52) U.S. Cl. .......................... 392/485; 392/465; 210/175
(58) Field of Classification Search ........................ None
See application file for complete search history.

(56) References Cited

U.S. PATENT DOCUMENTS

| 2,514,415 | A | 7/1950 | Rasch |
| 2,681,319 | A | 6/1954 | Bodamer |
| 2,681,320 | A | 6/1954 | Bodamer |
| 2,788,319 | A | 4/1957 | Pearson |
| 2,794,777 | A | 6/1957 | Pearson |
| 2,815,320 | A | 12/1957 | Kollsman |
| 2,854,394 | A | 9/1958 | Kollsman |
| 2,923,674 | A | 2/1960 | Kressman |
| 2,943,989 | A | 7/1960 | Kollsman |
| 3,014,855 | A | 12/1961 | Kressman |
| 3,074,864 | A | 1/1963 | Gaysowski |
| 3,099,615 | A | 7/1963 | Kollsman |
| 3,148,687 | A | 9/1964 | Dosch |
| 3,149,061 | A | 9/1964 | Parsi |
| 3,149,062 | A | 9/1964 | Gottschal et al. |
| 3,165,460 | A | 1/1965 | Zang et al. |
| 3,291,713 | A | 12/1966 | Parsi |
| 3,330,750 | A | 7/1967 | McRae et al. |
| 3,341,441 | A | 9/1967 | Giuffrida et al. |
| 3,375,208 | A | 3/1968 | Duddy |
| 3,627,703 | A | 12/1971 | Kojima et al. |
| 3,630,378 | A | 12/1971 | Bauman |
| 3,645,884 | A | 2/1972 | Gilliland |
| 3,686,089 | A | 8/1972 | Korngold |
| 3,755,135 | A | 8/1973 | Johnson |

(Continued)

FOREIGN PATENT DOCUMENTS

AU B-18629/92 10/1992

(Continued)

OTHER PUBLICATIONS

Chemical Processing, Family of High Temperature RO Membrane Elements, Product News, p. 1. Aug. 15, 2002.

(Continued)

*Primary Examiner* — Thor Campbell (57) ABSTRACT

The present invention generally relates to a water treatment system and a sanitization system and method. A sanitization fluid, typically water at a pharmaceutically acceptable temperature, is intermittently provided to the water treatment system for minimal periods of time.

25 Claims, 3 Drawing Sheets

U.S. PATENT DOCUMENTS

| | | | |
|---|---|---|---|
| 3,869,375 A | 3/1975 | Ono et al. |
| 3,869,376 A | 3/1975 | Tejeda |
| 3,870,033 A | 3/1975 | Faylor et al. |
| 3,876,565 A | 4/1975 | Takashima et al. |
| 3,989,615 A | 11/1976 | Kiga et al. |
| 4,032,452 A | 6/1977 | Davis |
| 4,033,850 A | 7/1977 | Kedem et al. |
| 4,089,758 A | 5/1978 | McAloon |
| 4,116,889 A | 9/1978 | Chlanda et al. |
| 4,119,581 A | 10/1978 | Rembaum et al. |
| 4,130,473 A | 12/1978 | Eddleman |
| 4,153,761 A | 5/1979 | Marsh |
| 4,167,551 A | 9/1979 | Tamura et al. |
| 4,191,811 A | 3/1980 | Hodgdon |
| 4,197,206 A | 4/1980 | Karn |
| 4,216,073 A | 8/1980 | Goldstein |
| 4,217,200 A | 8/1980 | Kedem et al. |
| 4,226,688 A | 10/1980 | Kedem et al. |
| 4,228,000 A | 10/1980 | Hoeschler |
| 4,294,933 A | 10/1981 | Kihara et al. |
| 4,298,442 A | 11/1981 | Giuffrida |
| 4,321,145 A | 3/1982 | Carlson |
| 4,330,654 A | 5/1982 | Ezzell et al. |
| 4,342,651 A | 8/1982 | Ahrens |
| 4,358,545 A | 11/1982 | Ezzell et al. |
| 4,374,232 A | 2/1983 | Davis |
| 4,430,226 A | 2/1984 | Hegde et al. |
| 4,465,573 A | 8/1984 | O'Hare |
| 4,473,450 A | 9/1984 | Nayak et al. |
| 4,505,797 A | 3/1985 | Hodgdon et al. |
| 4,574,049 A | 3/1986 | Pittner |
| 4,610,790 A | 9/1986 | Reti et al. |
| 4,614,576 A | 9/1986 | Goldstein |
| 4,632,745 A | 12/1986 | Giuffrida et al. |
| 4,636,296 A | 1/1987 | Kunz |
| 4,655,909 A | 4/1987 | Furuno et al. |
| 4,661,411 A | 4/1987 | Martin et al. |
| 4,671,863 A | 6/1987 | Tejeda |
| 4,687,561 A | 8/1987 | Kunz |
| 4,702,810 A | 10/1987 | Kunz |
| 4,707,240 A | 11/1987 | Parsi et al. |
| 4,747,929 A | 5/1988 | Siu et al. |
| 4,747,955 A | 5/1988 | Kunin |
| 4,751,153 A | 6/1988 | Roth |
| 4,753,681 A | 6/1988 | Giuffrida et al. |
| 4,770,793 A | 9/1988 | Treffry-Goatley et al. |
| 4,804,451 A | 2/1989 | Palmer |
| 4,849,102 A | 7/1989 | Latour et al. |
| 4,871,431 A | 10/1989 | Parsi |
| 4,872,958 A | 10/1989 | Suzuki et al. |
| 4,915,803 A | 4/1990 | Morris |
| 4,925,541 A | 5/1990 | Giuffrida et al. |
| 4,931,160 A | 6/1990 | Giuffrida |
| 4,956,071 A | 9/1990 | Giuffrida et al. |
| 4,964,970 A | 10/1990 | O'Hare |
| 4,969,983 A | 11/1990 | Parsi |
| 4,983,267 A | 1/1991 | Moeglich et al. |
| 5,026,465 A | 6/1991 | Katz et al. |
| 5,030,672 A | 7/1991 | Hann et al. |
| 5,032,265 A | 7/1991 | Jha et al. |
| 5,066,375 A | 11/1991 | Parsi et al. |
| 5,066,402 A | 11/1991 | Anselme et al. |
| 5,073,268 A | 12/1991 | Saito et al. |
| 5,082,472 A | 1/1992 | Mallouk et al. |
| 5,084,148 A | 1/1992 | Kazcur et al. |
| 5,092,970 A | 3/1992 | Kaczur et al. |
| 5,106,465 A | 4/1992 | Kaczur et al. |
| 5,116,509 A | 5/1992 | White |
| 5,120,416 A | 6/1992 | Parsi et al. |
| 5,126,026 A | 6/1992 | Chlanda |
| 5,128,043 A | 7/1992 | Wildermuth |
| 5,154,809 A | 10/1992 | Oren et al. |
| 5,166,220 A | 11/1992 | McMahon |
| 5,176,828 A | 1/1993 | Proulx |
| 5,192,432 A | 3/1993 | Andelman |
| 5,196,115 A | 3/1993 | Andelman |
| 5,203,976 A | 4/1993 | Parsi et al. |
| 5,211,823 A | 5/1993 | Giuffrida et al. |
| 5,223,103 A | 6/1993 | Kazcur et al. |
| 5,240,579 A | 8/1993 | Kedem |
| 5,244,579 A | 9/1993 | Horner et al. |
| 5,254,227 A | 10/1993 | Cawlfield et al. |
| 5,259,936 A | 11/1993 | Ganzi |
| 5,292,422 A | 3/1994 | Liang et al. |
| 5,308,466 A | 5/1994 | Ganzi et al. |
| 5,308,467 A | 5/1994 | Sugo et al. |
| 5,316,637 A | 5/1994 | Ganzi et al. |
| 5,342,521 A | 8/1994 | Bardot et al. |
| 5,346,624 A | 9/1994 | Libutti et al. |
| 5,346,924 A | 9/1994 | Giuffrida |
| 5,356,849 A | 10/1994 | Matviya et al. |
| 5,358,640 A | 10/1994 | Zeiher et al. |
| 5,376,253 A | 12/1994 | Rychen et al. |
| 5,411,641 A | 5/1995 | Trainham, III et al. |
| 5,415,786 A | 5/1995 | Martin et al. |
| 5,425,858 A | 6/1995 | Farmer |
| 5,425,866 A | 6/1995 | Sugo et al. |
| 5,434,020 A | 7/1995 | Cooper |
| 5,444,031 A | 8/1995 | Hayden |
| 5,451,309 A | 9/1995 | Bell |
| 5,458,787 A | 10/1995 | Rosin et al. |
| 5,460,725 A | 10/1995 | Stringfield |
| 5,460,728 A | 10/1995 | Klomp et al. |
| 5,489,370 A | 2/1996 | Lomasney et al. |
| 5,503,729 A | 4/1996 | Elyanow et al. |
| 5,518,626 A | 5/1996 | Birbara et al. |
| 5,518,627 A | 5/1996 | Tomoi et al. |
| 5,536,387 A | 7/1996 | Hill et al. |
| 5,538,611 A | 7/1996 | Otowa |
| 5,538,655 A | 7/1996 | Fauteux et al. |
| 5,539,002 A | 7/1996 | Watanabe |
| 5,547,551 A | 8/1996 | Bahar et al. |
| 5,558,753 A | 9/1996 | Gallagher et al. |
| 5,580,437 A | 12/1996 | Trainham, III et al. |
| 5,584,981 A | 12/1996 | Turner et al. |
| 5,591,344 A * | 1/1997 | Kenley et al. ............... 210/636 |
| 5,593,563 A | 1/1997 | Denoncourt et al. |
| 5,599,614 A | 2/1997 | Bahar et al. |
| 5,626,761 A * | 5/1997 | Howery et al. ............... 210/651 |
| 5,670,053 A | 9/1997 | Collentro et al. |
| 5,679,228 A | 10/1997 | Elyanow et al. |
| 5,679,229 A | 10/1997 | Goldstein et al. |
| 5,714,521 A | 2/1998 | Kedem et al. |
| 5,716,531 A | 2/1998 | Kenley et al. |
| RE35,741 E | 3/1998 | Oren et al. |
| 5,733,602 A | 3/1998 | Hirose et al. |
| 5,736,023 A | 4/1998 | Gallagher et al. |
| 5,759,373 A | 6/1998 | Terada et al. |
| 5,762,421 A | 6/1998 | Ross |
| 5,762,774 A | 6/1998 | Tessier |
| 5,766,479 A | 6/1998 | Collentro et al. |
| 5,788,826 A | 8/1998 | Nyberg |
| 5,804,055 A | 9/1998 | Coin et al. |
| 5,814,197 A | 9/1998 | Batchelder et al. |
| 5,837,124 A | 11/1998 | Su et al. |
| 5,858,191 A | 1/1999 | DiMascio et al. |
| 5,868,164 A * | 2/1999 | Haskett ............... 137/624.11 |
| 5,868,915 A | 2/1999 | Ganzi et al. |
| 5,891,328 A | 4/1999 | Goldstein |
| 5,925,240 A * | 7/1999 | Wilkins et al. ............... 210/88 |
| 5,928,807 A | 7/1999 | Elias |
| 5,954,935 A | 9/1999 | Neumeister et al. |
| 5,961,805 A | 10/1999 | Terada et al. |
| 5,980,716 A | 11/1999 | Horinouchi et al. |
| 6,056,878 A | 5/2000 | Tessier et al. |
| 6,099,716 A | 8/2000 | Molter et al. |
| 6,099,735 A * | 8/2000 | Kelada ............... 210/652 |
| 6,103,125 A | 8/2000 | Kuepper |
| 6,126,834 A | 10/2000 | Tonelli et al. |
| RE36,972 E | 11/2000 | Baker et al. |
| 6,146,524 A | 11/2000 | Story |
| 6,149,788 A | 11/2000 | Tessier et al. |
| 6,171,374 B1 | 1/2001 | Barton et al. |
| 6,187,154 B1 | 2/2001 | Yamaguchi et al. |
| 6,187,162 B1 | 2/2001 | Mir |
| 6,190,528 B1 | 2/2001 | Li et al. |
| 6,190,558 B1 | 2/2001 | Robbins |

| | | |
|---|---|---|
| 6,193,869 B1 | 2/2001 | Towe et al. |
| 6,197,174 B1 | 3/2001 | Barber et al. |
| 6,197,189 B1 | 3/2001 | Schwartz et al. |
| 6,214,204 B1 | 4/2001 | Gadkaree et al. |
| 6,228,240 B1 | 5/2001 | Terada et al. |
| 6,235,166 B1 | 5/2001 | Towe et al. |
| 6,248,226 B1 | 6/2001 | Shinmei et al. |
| 6,254,741 B1 | 7/2001 | Stuart et al. |
| 6,258,278 B1 | 7/2001 | Tonelli et al. |
| 6,267,891 B1 | 7/2001 | Tonelli et al. |
| 6,274,019 B1 | 8/2001 | Kuwata |
| 6,279,019 B1 | 8/2001 | Oh et al. |
| 6,284,124 B1 | 9/2001 | DiMascio et al. |
| 6,284,399 B1 | 9/2001 | Oko et al. |
| 6,296,751 B1 | 10/2001 | Mir |
| 6,303,037 B1 | 10/2001 | Tamura et al. |
| 6,342,163 B1 * | 1/2002 | DeLonge et al. ............ 210/749 |
| 6,375,812 B1 | 4/2002 | Leonida |
| 6,402,916 B1 | 6/2002 | Sampson et al. |
| 6,402,917 B1 | 6/2002 | Emery et al. |
| 6,461,512 B1 | 10/2002 | Hirayama et al. |
| 6,468,430 B1 | 10/2002 | Kimura et al. |
| 6,471,853 B1 | 10/2002 | Moscaritolo |
| 6,482,304 B1 | 11/2002 | Emery et al. |
| 6,485,649 B1 | 11/2002 | Terava et al. |
| 6,579,445 B2 * | 6/2003 | Nachtman et al. ............ 210/85 |
| 6,607,647 B2 | 8/2003 | Wilkins et al. |
| 6,607,668 B2 | 8/2003 | Rela |
| 6,627,073 B2 | 9/2003 | Hirota et al. |
| 6,648,307 B2 | 11/2003 | Nelson et al. |
| 6,649,037 B2 | 11/2003 | Liang et al. |
| 6,730,227 B2 | 5/2004 | Zeiher et al. |
| 6,766,812 B1 | 7/2004 | Gadini |
| 6,773,588 B2 | 8/2004 | Beeman et al. |
| 6,783,666 B2 | 8/2004 | Takeda et al. |
| 6,808,608 B2 | 10/2004 | Srinivasan et al. |
| 6,824,662 B2 | 11/2004 | Liang et al. |
| 7,122,149 B2 * | 10/2006 | Li et al. ............................ 422/26 |
| 7,147,785 B2 | 12/2006 | Arba et al. |
| 2001/0003329 A1 | 6/2001 | Sugaya et al. |
| 2002/0070107 A1 * | 6/2002 | Usinowicz et al. ........ 204/228.3 |
| 2002/0092769 A1 | 7/2002 | Garcia et al. |
| 2002/0144954 A1 | 10/2002 | Arba et al. |
| 2002/0179508 A1 * | 12/2002 | Nachtman et al. ............ 210/136 |
| 2003/0080467 A1 | 5/2003 | Andrews et al. |
| 2003/0089609 A1 | 5/2003 | Liang et al. |
| 2003/0098266 A1 | 5/2003 | Shiue et al. |
| 2003/0155243 A1 | 8/2003 | Sferrazza |
| 2003/0201235 A1 | 10/2003 | Chidambaran et al. |
| 2004/0074252 A1 | 4/2004 | Shelton |
| 2004/0079700 A1 | 4/2004 | Wood et al. |
| 2004/0109788 A1 * | 6/2004 | Li et al. .............................. 422/3 |
| 2004/0195157 A1 * | 10/2004 | Mullins et al. .................. 210/90 |
| 2005/0016932 A1 | 1/2005 | Arba et al. |
| 2005/0103622 A1 | 5/2005 | Jha et al. |
| 2005/0103630 A1 | 5/2005 | Ganzi et al. |
| 2005/0103631 A1 | 5/2005 | Freydina et al. |
| 2005/0103644 A1 | 5/2005 | Wilkins et al. |
| 2005/0103722 A1 | 5/2005 | Freydina et al. |
| 2005/0103723 A1 | 5/2005 | Wilkins et al. |
| 2005/0109703 A1 | 5/2005 | Newenhizen |
| 2006/0251542 A1 * | 11/2006 | Sims ............................... 422/33 |
| 2007/0215474 A1 * | 9/2007 | Batchelder et al. ........... 204/524 |
| 2009/0038552 A1 * | 2/2009 | Baker et al. ................ 119/14.03 |
| 2009/0308813 A1 * | 12/2009 | Haldiman ..................... 210/663 |

FOREIGN PATENT DOCUMENTS

| | | |
|---|---|---|
| CA | 2316012 | 11/2001 |
| DE | 1 201 055 | 9/1965 |
| DE | 3238280 | 4/1984 |
| DE | 4016000 | 11/1991 |
| DE | 44 18 812 | 12/1995 |
| DE | 199 42 347 | 3/2001 |
| EP | 0170895 | 2/1986 |
| EP | 0 462 606 | 12/1991 |
| EP | 0 503 589 | 9/1992 |
| EP | 0 621 072 | 10/1994 |
| EP | 0 680 932 | 11/1995 |
| EP | 0803474 | 10/1997 |
| EP | 0 870 533 | 10/1998 |
| EP | 1 068 901 | 1/2001 |
| EP | 1075 868 | 2/2001 |
| EP | 1 101 790 | 5/2001 |
| EP | 1 106 241 | 6/2001 |
| EP | 1172145 | 1/2002 |
| EP | 1222954 | 7/2002 |
| EP | 1 340 719 | 9/2003 |
| EP | 1506941 | 2/2005 |
| GB | 776469 | 6/1957 |
| GB | 877239 | 9/1961 |
| GB | 880344 | 10/1961 |
| GB | 893051 | 4/1962 |
| GB | 942762 | 11/1963 |
| GB | 1048026 | 11/1966 |
| GB | 1137679 | 12/1968 |
| GB | 1 381 681 | 1/1975 |
| GB | 1448533 | 9/1976 |
| JP | 54-005888 | 1/1979 |
| JP | 07-155750 | 6/1995 |
| JP | 07-265865 | 10/1995 |
| JP | 09-253643 | 9/1997 |
| JP | 2000126767 | 5/2000 |
| JP | 2001-079358 | 3/2001 |
| JP | 2001-079553 | 3/2001 |
| JP | 2001-104960 | 4/2001 |
| JP | 2001-113137 | 4/2001 |
| JP | 2001-113279 | 4/2001 |
| JP | 2001-113280 | 4/2001 |
| JP | 2001-121152 | 5/2001 |
| JP | 2002-126744 | 5/2002 |
| JP | 2005007347 | 1/2005 |
| JP | 2005007348 | 1/2005 |
| RO | 114 874 | 8/1999 |
| SU | 216622 | 11/1972 |
| SU | 990256 | 1/1983 |
| SU | 1118389 | 10/1984 |
| WO | WO 92/03202 | 3/1992 |
| WO | WO 92/11089 | 7/1992 |
| WO | WO 95/32052 | 11/1995 |
| WO | WO 95/32791 | 12/1995 |
| WO | WO 96/22162 | 7/1996 |
| WO | WO 97/25147 | 7/1997 |
| WO | WO 97/46491 | 12/1997 |
| WO | WO 97/46492 | 12/1997 |
| WO | WO 98/11987 | 3/1998 |
| WO | WO 98/17590 | 4/1998 |
| WO | WO 98/20972 | 5/1998 |
| WO | WO 98/58727 | 12/1998 |
| WO | WO 99/39810 | 8/1999 |
| WO | WO 00/30749 | 6/2000 |
| WO | WO 00/64325 | 11/2000 |
| WO | WO 00/75082 | 12/2000 |
| WO | WO 01/49397 | 7/2001 |
| WO | WO 02/04357 | 1/2002 |
| WO | WO 02/14224 | 2/2002 |
| WO | WO 02/26629 | 4/2002 |
| WO | WO 03/040042 | 5/2003 |
| WO | WO 03/086590 | 10/2003 |

OTHER PUBLICATIONS

Osmonics® Hot-Water Sanitizable RO Systems, Specifications, pp. 1-2. Copyright 2000 Osonics, Inc. www.osmonics.coom.

Peterson, R.J. et al., Temperature-Resistant Elements for Reverse Osmosis Treatment of Hot Process Waters, Published Dec. 1983, Filmtec Corporation, Minneapolis, Minnesota 55435. Prepared for the U.S. Department of Energy, Under DOE Contract No. DE-FC07-82ID12423 (DOE/ID/12423-TI-DE84005190), pp. 1-69.

Reverse Osmosis Membrane Elements—131 Duratherm®, pp. 1-2, www.osmonics.com Aug. 2002.

U.S.P. Requirements for Water for Injection, pp. 1752-1753, 1927-1929. Aug. 2002.

Weitnauer, Angela et al., Reverse Osmosis for WFI and PW, Published in: Ultrapure Water, Date: Mar. 1, 1996. pp. 1-6. www.osmonics.com.

Wise, Brian, Chemical Processing, Turning Up the Heat, Hot Water Sanitation Membranes Tackle Microbes in RO Permeate Water, pp. 1-6. Aug. 2002.

Wise, Brian et al, "Hot Water Sanitization & RO: A Plain and Simple Introduction", Presented at: Water Conditioning & Purification Magazine; Date Presented: Feb. 1, 2002. OSMONICS®, p. 1-6. www.osmonics.com.

Wood, Jonathan et al., The Use of Hot Water for Sanitization of RO Membranes in Ultrapure Water Systems, U.S. Filter/Ionpure, Inc., Lowell, MA, USA. Oct. 25, 1995, Presented at the 1997 Fifteenth Annual Membrane Technology/Separations Planning Conference, sponsored by Business Communications Co., Inc., Newton, MA, Oct. 29, 1997, pp. 1-10.

ASTM, "Standard Practice for Calculation and Adjustment of the Langelier Saturation Index for Reverse Osmosis," Designation: D3739-94 (Reapproved 1998), pp. 1-4.

Calay, J.-C. et al., "The Use of EDI to Reduce the Ammonia Concentration in Steam Generators Blowdown of PWR Nuclear Power Plants," *PowerPlant Chemistry*, vol. 2, No. 8, 2000, pp. 467-470.

Gifford et al., "An Innovative Approach to Continuous Electrodeionization Module and System Design for Power Applications," *Official Proceedings of the 61$^{st}$ Annual Meeting IWC 2000*, Oct. 22-26, 2000, Pittsburgh, PA, Paper No. 0052, pp. 479-485.

Wood, Jonathan et al., "Hot Water Sanitization of Continuous Electrodeionization Systems," *Pharmaceutical Engineering*, vol. 20, No. 6, Nov./Dec. 2000, pp. 1-15.

Guide to Inspections of High Purity Water Systems, 10 pgs., www.fda.gov/ora/inspect_ref/igs/high.html.

CN 1044411A, Shanghai Synthetic Resin Institute, Aug. 8, 1990, translation only.

Prescott, Lansing M.; John P. Harley; and Donald A. Klein. "Microbiology." Wm. C. Brown Publishers. (1990), pp. 237-238.

Earle, R.L., "Unit Operations in Food Processing." New Zealand Institute of Food and Science Technology, Inc., Chapter 6, Figure 6.4 (1983), 9 pages.

\* cited by examiner

Fig. 3
Rapid HWS Cycle

WATER TREATMENT SYSTEM AND PROCESS

RELATED APPLICATIONS

This application claims priority under 35 U.S.C. §119(e) to U.S. Provisional Application Ser. No. 60/686,218, entitled "IMPROVED SANITIZATION PROCESS AND WATER SYSTEM THAT REQUIRES MICROBIAL CONTROL," filed on Jun. 1, 2005, which is herein incorporated by reference in its entirety.

BACKGROUND OF INVENTION

1. Field of Invention

The present invention relates to a water treatment system and process and, more particularly, to a water treatment system and process utilizing intermittent sanitization.

2. Discussion of Related Art

Water treatment systems utilizing reverse osmosis units and electrochemical deionization units are typically operated continuously in a recirculation mode under ambient temperature in order to control microorganism growth during periods of low or no demand. In addition to continuously operating the water treatment systems to control microorganism growth, a sanitization fluid may be introduced into the system, typically for 60 minutes or longer on a weekly basis. Typically, hot water ranging in temperature from 65° C. to 80° C. is passed through a water treatment system to maintain the system at the desired temperature for about 60 minutes. The 60 minute or longer cycle at temperature commonly includes time to ramp up to, and cool down from, the desired temperature in addition to the 60 minutes hold at temperature. Water treatment systems disclosing sanitization cycles of 60 minutes or longer are disclosed in U.S. Pat. No. 5,868,915 by Ganzi et al. and U.S. Pat. No. 6,461,512 by Hirayama et al. and in U.S. Patent Publication No. 2005/0016932 by Arba et al.

SUMMARY OF INVENTION

The present invention generally relates to a water treatment system and process utilizing a sanitization system.

The present invention provides, in one embodiment a non-recirculating water treatment system. The treatment system comprises a treatment unit, a source of a sanitization fluid, and a controller in communication with an inlet of the treatment unit. The controller is responsive to at least one of an operational startup of the treatment unit, an operational shutdown of the treatment unit, a pre-determined time period of in-service operation of the treatment unit, a pre-determined out of service time period of the treatment unit, and microbial count and is configured to generate a control signal that adjusts an amount of flow of the sanitization fluid to the inlet.

In another embodiment, the present invention is directed to a water treatment system comprising a treatment unit, a source of a sanitization fluid, and means for intermittent daily delivery of the sanitization fluid to an inlet of the treatment unit.

Another embodiment of the present invention is directed to a method of controlling a population growth of microorganisms in a water treatment unit. The method comprises providing a treatment unit, providing a source of a sanitization fluid fluidly connected to the treatment unit, and generating at least one signal based on an operational startup of the treatment unit, an operational shutdown of the treatment unit, a pre-determined time period of in-service operation of the treatment unit, a pre-determined out of service time period of the treatment unit, and microbial count. The sanitization fluid is intermittently provided to an inlet of the treatment unit in response to the at least one signal.

In another embodiment, the present invention is directed to a water treatment system comprising a treatment unit, a source of a sanitization fluid, and a controller in communication with an inlet of the treatment unit and configured to intermittently generate a plurality of control signals daily that adjusts an amount of flow of the sanitization fluid to the inlet. The controller is responsive to at least one of an operational startup of the treatment unit, an operational shutdown of the treatment unit, a pre-determined time period of in-service operation of the treatment unit, a pre-determined out of service time period, and microbial count.

Other advantages, novel features and objects of the invention will become apparent from the following detailed description of the invention when considered in conjunction with the accompanying drawings, which are schematic and are not intended to be drawn to scale. In the figures, each identical, or substantially similar component is represented by a single numeral or notation. For purposed of clarity, not every component is labeled in every figure, nor is every component of each embodiment of the invention shown where illustration is not necessary to allow those of ordinary skill in the art to understand the invention.

BRIEF DESCRIPTION OF DRAWINGS

Preferred, non-limiting embodiments of the present invention will be described by way of example and with reference to the accompanying drawings, in which.

DETAILED DESCRIPTION

The present invention is directed to an ambient temperature water treatment system for providing water for industrial, commercial and residential applications. As used herein, an "ambient temperature system" is defined as a water treatment system operating at a normally occurring temperature without the addition of energy to raise the system temperature. Ambient temperature systems may operate at temperatures above freezing to about 40° C. In some instances, ambient water treatment systems operate between and including about 7° C. and about 35° C.

The water treatment system includes one or more treatment units. A treatment unit is defined herein as any unit which removes dissolved species from a liquid to be treated. For example, treatment units include reverse osmosis units (RO) and electrochemical deionization units including electrodialysis (ED), electrodialysis reversal (EDR), electrodeionization (EDI), capacitive deionization, continuous electrodeionization (CEDI), and reversible continuous electrodeionization (RCEDI).

In one embodiment of the invention, the treatment system is a non-recirculating system operated at ambient temperature. As used herein the phrase "non-recirculating system" is used to define a water treatment system that does not recirculate during periods of no demand for treated water and excludes individual treatment units which may recirculate a reject stream for further treatment during operation. The non-recirculating system is distinguished from typical ambient temperature treatment systems which include a recirculation line to continuously operate during periods of no demand in order to control growth of microorganisms. Typical ambient treatment systems include a recirculation system to continually provide water to the treatment units even when there is no demand for treated water. Because the water treatment system of the invention may not recirculate liquid during periods of no demand, and may be, therefore shut down during periods of no demand, savings in energy and water consumption may be realized when compared to consumption of continuously recirculating systems.

In one embodiment of the invention, a sanitization fluid may be intermittently passed through the water treatment system and/or an individual water treatment unit for a short period of time at the start up of the system, and/or during periods of operation, and/or during shutdown of the system, and/or during out of service periods of the system. As used herein, "sanitization fluid" may be any fluid compatible with the treatment unit and able to inactivate some or all of the microorganisms present with the treatment unit. As used herein, an "in activated microorganism" is one that is destroyed or killed, or otherwise incapable of propagating into or forming other microorganisms. The sanitization fluid may pass through the treatment unit for a minimal period of time to control growth of microorganisms. For example, it has been found that a sanitization period of time ranging from about 1 minute to about 5 minutes is effective to control the growth of microorganisms in a treatment unit. As used herein, "sanitization period of time" is defined as the length of time the sanitization fluid is present within the treatment system substantially replacing the fluid to be treated, and does not include any ramp up or ramp down time that may result during preparation, introduction, or removal of the sanitization fluid. "Sanitization period of time" and "period of sanitization" are used interchangeably herein.

The treatment system may include one or more RO units, one or more electrochemical deionization units, and combinations thereof. RO is a filtration technique that provides for the removal of dissolved species from a water supply. Typically, water is supplied to one side of an RO membrane at elevated pressure and treated water is collected form the low pressure side of the membrane. The RO membrane is structured so that water may pass through the membrane while other compounds, for example, dissolved ionic species, are retained on the high pressure side. A concentrate containing an elevated concentration of ionic species may be discharge or recycled, while a permeate, typically containing a reduce concentration of ionic species, is discharged for use or further treatment.

An electrochemical deionization device may be any device that employs an electric current or electric field to reduce the concentration of ionic compounds in a water sample. Some electrochemical deionization devices have no moving parts and/or have no filtration membrane. Electrodeionization devises, methods of use, and methods of making are described by, for example, Giuffrida et al. in U.S. Pat. Nos. 4,632,745, 4,925,541, 4,956,071 and 5,211,823, by Ganzi in U.S. Pat. No. 5,259,936, by Ganzi et al., in U.S. Pat. No. 5,316,637, by Oren et al. in U.S. Pat. No. 5,154,809, by Kedem in U.S. Pat. No. 5,240,579, by Liang et al. in U.S. patent application Ser. No. 09/954,986 and U.S. Pat. No. 6,649,037, by Andelman in U.S. Pat. No. 5,192,432, Martin et. al. in U.S. Pat. No. 5,415,786, and by Farmer in U.S. Pat. No. 5,425,858.

The treatment unit, in one set of embodiments, may be sanitized by introducing a sanitization fluid or other liquid able to inactivate some or all of the microorganisms present within treatment unit. Although no microbial requirement exists in the United States Pharmacopoeia (USP) monographs for Purified Water or Water For Injection, the USP recommends limiting Purified Water to 100 colony forming units per milliliter (cfu/mL) and Water For Injection to 10 cfu/100 mL. Thus, in some embodiments, the present invention provides disinfection of a treatment unit by the use of a liquid, for example, hot water or another heated liquid, to inactivate some or all of the microorganisms that may be present in the treatment unit.

The liquid may be heated within the unit, and/or externally of the unit, using any suitable technique known to those of ordinary skill in the art. Thus, in one embodiment, the liquid is heated externally of the water treatment unit before being introduced to the unit; in another embodiment, the liquid is heated within the treatment unit; in another embodiment, the liquid is heated externally of the unit, then further heated within the unit (for example, to raise and maintain the temperature of the liquid within the unit, for instance to a pharmaceutically acceptable sanitization temperature). In one embodiment, treated water which is stored at a temperature greater than ambient may be directed through the treatment unit. In another embodiment, the water is heated within the treatment unit at a rate of at least about 5° C./min, at least about 10° C./min, at least about 15° C./min, or at least about 20° C./min and the like.

According to one embodiment, sanitization may be performed by passing a liquid such as hot water through the treatment unit, for example, passing a liquid at a temperature of at least the pharmaceutically acceptable sanitization temperature through the treatment unit for a predetermined sanitization period of time ranging from between and including about 1 minute to about 5 minutes. In another embodiment, the sanitization fluid is passed through the treatment unit for a sanitization period of time ranging from about 1.5 minutes to about 4 minutes. In yet another embodiment, the sanitization fluid is passed through the treatment unit for a sanitization period of time of about 2 minutes. In instances where the sanitization fluid is passed through an electrodeionization device, the sanitization fluid may be passed through a portion of the electrodeionization device, for example, through one or more concentrating compartments and/or one or more depleting compartments.

A "pharmaceutically acceptable sanitization temperature," as used herein, is one where a substantial number of microorganisms exposed to such a temperature are inactivated and, in particular, to one wherein the number of microorganisms is inactivated to below an acceptable action limit or a pharmaceutically acceptable level, for example, to below 1000 cfu/mL, below 100 cfu/mL, or below 10 cfu/mL. In one embodiment, the present invention provides for passing hot water or other liquids having a temperature range between and including about 60° C. and about 80° C. through the treatment unit. In another embodiment, the present invention provides for passing hot water or other liquids having a temperature range between and including about 65° C. and 80° C. In one embodiment, water at a temperature of about 80° C. is passed through a water treatment unit.

Temperature of the sanitation fluid may be measured at any suitable location within the water treatment system so long as the measurement correlates to, or is representative of, the water temperature within an individual unit or units of the system. Systems comprising multiple water treatment units may include multiple temperature sensors to monitor the water temperature of each unit.

Multiple water treatment units within a system utilizing a single source of hot water for sanitization may be subjected to different sanitization conditions at different times within an overall sanitization cycle for the system. For example, each of the water treatment units may comprise different operating variables, such as capacity and flow characteristics, which may result in different temperature profiles for each unit. Positions of each individual treatment unit and amounts of piping to each unit may also result in variations in temperature profiles. It is understood that there may be nominal variations in temperatures throughout the system and individual units.

Individual water treatment units positioned in series or parallel within a system may be sanitized with the same or different sanitization fluids, and may but need not be sanitized simultaneously. For example, the sanitization fluid may be simultaneously directed to two units in series or in parallel. Alternatively, one sanitization fluid may be directed to a first water treatment unit, and a second sanitization fluid may be directed to a second water treatment unit positioned in series or parallel.

In some cases, the sanitization fluid which is passed through the treatment unit comprises water, e.g. as described above. In one embodiment, the sanitization fluid consists essentially of water (i.e., the liquid may include other ions, salts, suspension matter, etc., so long as those of ordinary skill in the art would consider the liquid to be essentially water, for example, the liquid may be tap water, filtered water, etc). In another embodiment, the sanitization fluid consists of water, i.e., the water may have a trace or undetectable amount of ions, etc., but the water would be considered "pure" by those of ordinary skill in the art. In still other embodiments, additional materials such as disinfectants, salts, or the like may be added to the sanitization fluid. For example, the sanitization fluid may include phenolics, alcohols (such as isopropanol, isobutanol, ethanol, and the like), halogens (such as dissolved chlorine, bromine, and the like), heavy metals (such as silver nitrate and the like), quaternary ammonium compounds, detergents, aldehydes (such as formaldehyde, glutaraldehyde and the like), gases (such as carbon dioxide, ethylene oxide, ozone and the like).

In another embodiment, the present invention provides the use of thermally stable materials that are suitable for thermal cycling and other thermal changes. A defined herein, a "thermally suitable material" is one that can maintain its dimensional stability, having no significant changes in dimension or shape or mechanical properties under the influence of temperature and/or pressure.

According to one aspect of the invention, the water treatment system may not be operated during periods of no demand, and, therefore, may not have a system recirculation line. The water treatment system may be operated during any period of demand which may but need not be a predetermined period of time. In one embodiment, the water treatment system may operate during one or more portions of any 24 hour time period. For example, the water treatment system may operate for less than about 12 hours, or less than about 8 hours, and be shut down during the remainder of that 24 hour period.

In one embodiment, sanitization fluid may be provided to one or more treatment units during the start up, during shut down, during a period of in-service operation, during an out of service period, and combinations thereof. In one embodiment, sanitization fluid may be provided to one or more treatment units at intermittent intervals during operation of the treatment unit. As used herein, intermittent intervals are defined as irregular or periodic time periods. As used herein, periodic intervals are defined as regular time periods. Periods of sanitization may last from about 1 minute to about 5 minutes, or from about 1.5 minutes to about 4 minutes. In some embodiments, the sanitization periods last about 5 minutes, while in others about 4 minutes, and in others about 2 minutes.

In one embodiment, a water treatment unit operating for example for about 8 hours may be sanitized one or more times to provide a treated water suitable for a particular purpose. For example, the water treatment unit may be sanitized once during operational startup of the unit and or once during operational shutdown of the unit.

Alternatively or in addition to the startup and/or shutdown sanitization, the water treatment unit may be sanitized once or intermittently during in-service operation of the unit. During in-service operation, occurrence of one or more sanitization cycles may be triggered by any condition which may affect the quality of the treated water and/or the operating performance of the system or a particular unit within the system. For example, a sanitization cycle may run as a result of reaching a certain time for in-service operation, exceeding a specified microbial count, detecting a biochemical marker, meeting one or more process conditions, and combinations thereof. In one embodiment, exceeding a pre-determined microbial count may result in the operation of an automatic or manual sanitization cycle. For example, detection by an in-line microbial count sensor may automatically trigger a sanitization cycle, or a sample of treated water manually taken and analyzed may cause an operator to implement a sanitization cycle. In another embodiment, changes in membrane flux or rejection may trigger operation of a sanitization cycle. In other embodiments, operation of the sanitization cycle may occur based upon pre-determined periods of in-service operation.

The water treatment system may also be sanitized once or intermittently during an out of service period. For example, a sanitization cycle may be run manually or automatically after a predetermined out of service period is reached. In one embodiment, a water treatment system may be out of service for a period of days, such as a weekend, during which time one or more sanitization cycles may be run. In another embodiment, the sanitization cycle occurring while the water treatment system is out of service may be initiated from a location remote from the water treatment system.

Intervals between sanitization cycles during in-service periods of operation and out of service periods of the treatment unit may vary. In one embodiment, the time periods between intervals may vary from about 1 hour to about 4 hours. In another embodiment, the intervals may be periodic, for example every 2 hours. In one embodiment the water treatment system may be sanitized up from 1 to 8 times per 24 hour period.

Figure 1:
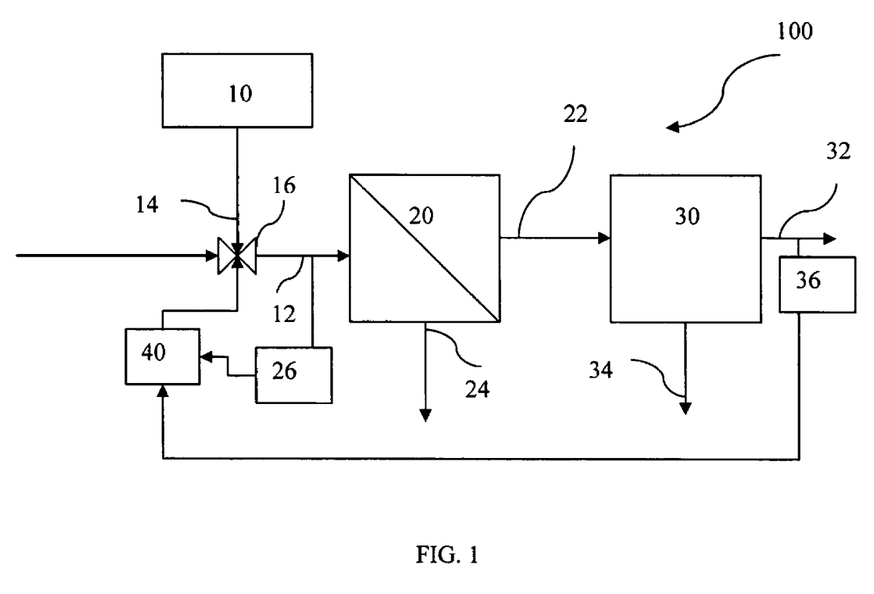
FIG. 1 is a schematic diagram showing a system of the invention.

FIG. 1 shows a water treatment system 100. Water to be treated enters RO unit 20 through line 12. Filtrate exits RO unit 20 through line 22 which feeds electrodeionization unit 30. Treated water exits electrodeionization unit 30 via line 32. A first concentrate is discharged from RO unit 20 through line 24 and a second concentrate is discharged from electrodeionization unit 30 via line 34. Hot water from heated tank 10 is fed to the RO unit 20 through line 12.

System 100 may include one or more control systems or controllers 40 that facilitate the operating parameters of the sanitization process of treatment system 100 and preferably, further react or provide an appropriate response to the measured characteristic. The measured characteristic can be transmitted to controller 40 which, if necessary, generates a corresponding signal according to a control scheme.

One or more optional sensors, as know in the art, may be positioned at desired locations within system 100 to detect one or more of various characteristics of the water to be treated, various characteristics of the sanitization fluid, various characteristics of the treated water, and various system or unit operating conditions. The sensors include, but are not limited to, sensors to detect temperature, pH, conductivity, in-line microbial count, membrane efficiency, and combinations thereof. Level sensors in a treated water storage tank may also be used to signal switching the water treatment system from an in-service to an out of service mode when the sensor indicates the tank is full to capacity.

Controller 40 may generate one or more signals or responses to one or more unit operations. Typically, controller 40 is configured to receive at least one indication of a characteristic of treatment system 100. For example, the water treatment system and/or an individual water treatment unit may be scheduled to be in service for a predetermined period of time, such as 8 hours, which may be communicated to controller 40. The controller 40 may generate one or more control signals based upon the scheduled in-service time period causing valve 16 to intermittently introduce the sanitization fluid to feed line 12. In one embodiment, the controller may receive a signal generated during the start up procedure of the water treatment system, and generate a control signal causing valve 16 to introduce the sanitization fluid to feed line 12 during the start up process.

Alternatively, a first signal may be generated during the shut down procedure of system 100 and a second signal may be generated during the start up procedure of system 100 causing the controller 40 to determine the period of time the system 100 has been out of service. The controller may then generate one or more control signals based upon the out-of-service time period causing valve 16 to introduce the sanitization fluid to feed line 12.

In one embodiment, a signal may be generated during the shut down procedure of system 100, at which time controller 40 may determine the length of time that has passed since the previous sanitization cycle occurred. If the previous sanitization cycle occurred within a predetermined time period, the controller 40 may not initiate a sanitization cycle. If the pervious sanitization cycle occurred outside of a predetermined time period, the controller 40 may initiate a control cycle.

In another embodiment, the signal generated during the shutdown procedure may cause controller 40 to monitor the period of time the system remains out of service. The controller 40 may initiate one or more sanitization cycles at intermittent or periodic intervals based upon the length of time the system is out of service.

In one embodiment, controller 40 may generate a signal to cause valve 16 to interrupt flow of the sanitization fluid to feed line 12 based upon a predetermined sanitization period. Controller 40 may also respond to a signal from a temperature sensor indicating the temperature within the water treatment system and/or an individual water treatment unit has reached and been maintained at a pharmaceutically acceptable sanitization temperature for a predetermined period of time.

In another embodiment, controller 40 may generate a signal to cause valve 16 to provide sanitization fluid to the water treatment system 100 and/or an individual unit based upon a signal representing an increase in microorganism population in the treated water above a desired limit.

In one embodiment, one or more sensors and controllers may communicate with one another or optionally with a centralized and/or remote monitoring, control, and/or data collection center. Communication between and among the sensors and the center may be hard wired, wireless, transmitted via the internet, phone line, video, and combinations thereof.

As shown in FIG. 1, temperature sensor 26 is positioned upstream of RO unit 20 and conductivity sensor 36 is positioned downstream of electrodeionization device 30. Temperature sensor 26 detects a rise in temperature as a result of the presence of the sanitization temperature. Once a predetermined temperature is reached and maintained for a specified period of time, the controller 40 interrupts flow of the sanitization fluid to the RO unit 20. Conductivity sensor 36 monitors treated water exiting the electrodeionization unit 30. If a conductivity measurement above a predetermined level is detected, the controller 40 generates a signal to valve 16 to deliver sanitization fluid to feed line 12.

The control loop of the control system may utilize any conventional control technique including, for example, proportional, integral, and derivative schemes as well as combinations thereof. The illustrated control scheme can be considered as a conventional negative feedback arrangement. The invention may also be practiced to involve other control configurations. For example, the control technique may incorporate adaptive methods that involve machine learning with or without statistical analysis, expert systems that apply reasoning capabilities to reach a conclusion, case-based reasoning, Bayesian networks, and/or behavior-based methods; and/or computational intelligence that involve iterative development or learning, e.g., parameter tuning that implicate neural networks or systems with predominant pattern recognition capabilities, fuzzy systems or techniques for reasoning under uncertainty, and evolutionary computational schemes that, for example, mimic biological behavior to generate increasingly stable control solutions.

Controller 40 may be implemented using one or more computer systems which may be, for example, a general-purpose computer such as those based on an Intel PENTIUM®-type processor, a Motorola PowerPC® processor, a Sun UltraSPARC® processor, a Hewlett-Packard PA-RISC® processor, or any other type of processor or combinations thereof. Alternatively, the computer system may include specially-programmed, special-purpose hardware, for example, an application-specific integrated circuit (ASIC) or controllers intended for water treatment systems.

The computer system can include one or more processors typically connected to one or more memory devices, which can comprise, for example, any one or more of a disk drive memory, a flash memory device, a RAM memory device, or other device for storing data. The memory component is typically used for storing programs and data during operation of the system 110 and/or the computer system. For example, memory may be used for storing historical data relating to the parameters of the water over a period of time, as well as current sensor measurement data. Software, including programming code that implements embodiments of the invention, can be stored on a computer readable and/or writeable nonvolatile recording medium, and then typically copied into one or more memory components wherein it can then be executed by the one or more processors. Such programming code may be written in any of a plurality of programming languages, for example, Java, Visual Basic, C, C#, or C++, Fortran, Pascal, Eiffel, Basic, COBAL, or any of a variety of combinations thereof.

The components of the computer system may be coupled by an interconnection mechanism, which may include one or more busses (e.g., between components that are integrated within a same device) and/or a network (e.g., between components that reside on separate discrete devices). The interconnection mechanism typically enables communications (e.g., data, instructions) to be exchanged between components of system.

The computer system can optionally include one or more input devices, for example, a keyboard, mouse, trackball, microphone, touch screen, and one or more output devices, for example, a printing device, display screen, or speaker. In addition, the computer system may also optionally have one or more interfaces that can connect the computer system to one or more communication networks (in addition or as an alternative to the network that may be formed by one or more of the components of system).

In one aspect of the invention, the ability to shut down the water treatment system during periods of no demand may produce cost savings by reducing water and power consumption when compared to water treatment systems designed to be continuously running even when there is no demand for treated water. The present invention also reduces the costs associated with the sanitization process by reducing the overall time required for sanitization. In another aspect of the invention, the water treatment system of the present invention may result in reduced space requirements and equipment costs with the elimination of unnecessary unit processes. For example, ultraviolet units may be eliminated from the water treatment system because the system may be sanitized prior to each start up. Similarly, post CDI submicron filters may be eliminated. A single train stop-start water treatment system with a RO unit and a CDI operated with four intermittent four minute sanitization periods per day reduces water consumption by about one million gallons per year, which, when combined with reductions in other operating costs results in significant savings when compared to a comparably sized single train RO/CDI system continuously operated during periods of no demand and sanitized once a week for about 60 minutes. These savings my be significantly increased for RO/CDI dual trains.

In another aspect of the invention, an intermittent sanitization period of about 1.5 minutes to about 4 minutes provides sufficient time to prevent the formation of a biofilm on wet surfaces of the water treatment units. As is understood in the art, exopolymer production and biofilm production typically occurs within hours to days of surface exposure to the water to be treated, after which attachment of other organisms to the biofilm occurs. A minimal sanitization period occurring at least once a day, as defined as any 24 hour period, may reduce and even eliminate formation of a biofilm.

EXAMPLES

The invention may be further understood with reference to the following examples, which are intended to serve as illustrations only, and not as limitations of the present invention as defined in the claims herein.

Example I

Figure 2:
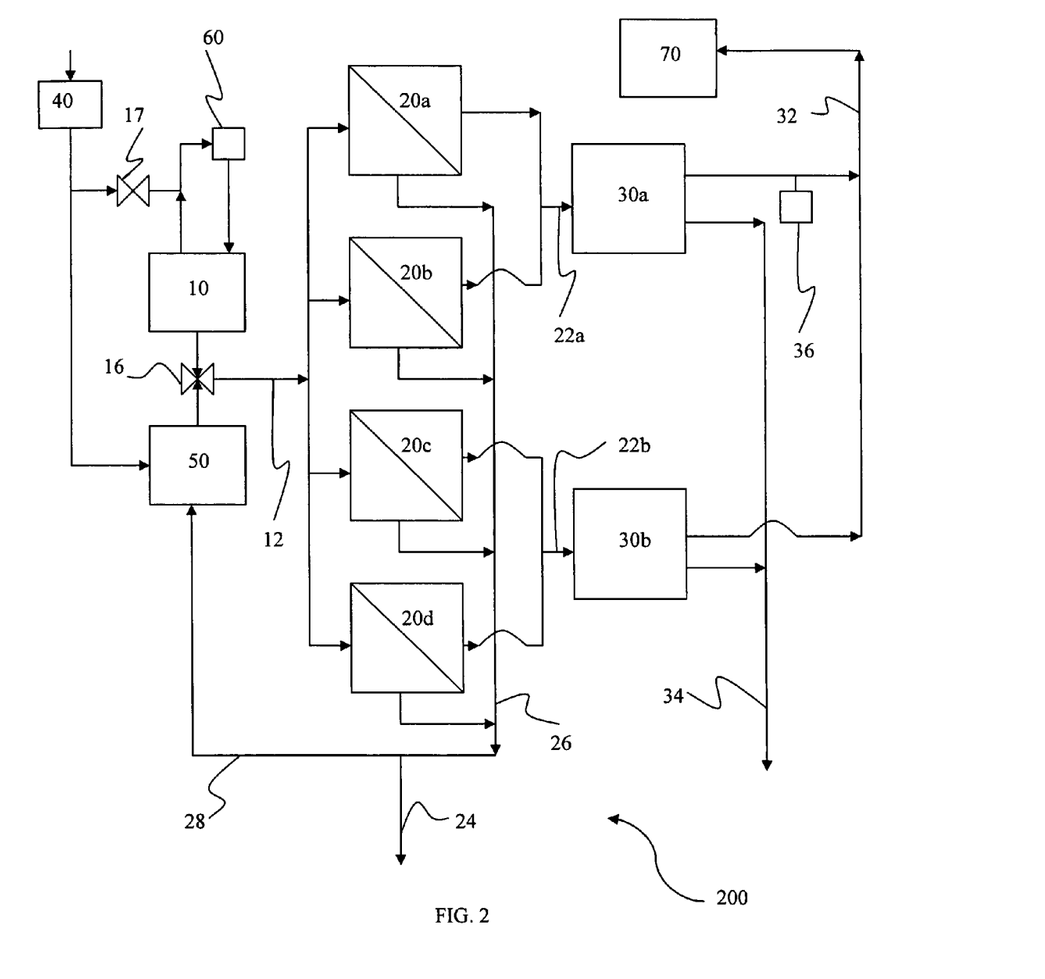
FIG. 2 is a schematic diagram showing one embodiment of the invention.

FIG. 2 shows a water treatment system 200 comprising four RO units 20a, 20b, 20c, and 20d in two sets of parallel lines. RO units 20a and 20b were fluidly connected to electrodeionization device 30a via lines 22a. RO units 20c and 20d were fluidly connected to electrodeionization device 30b via lines 22b. Concentrate from RO units 20a-d was removed from the units via lines 26, which were fluidly connected to a drain line 24 and a reject recycle line 28.

Feed water tank 50 and hot water tank 10 were fluidly connected to the RO units 20a-d via valve 16 and feed line 12. Hot water tank 10 included a recirculation line with heater 60 to maintain the water at a temperature of about 80° C. Raw feed at a temperature of about 23° C. entered system 200 though a softener 40 and was directed to tank 50 or was partially diverted to hot water tank 10 via valve 17.

Treated water exited electrodeionization devices 30a and 30b via lines 32 and was stored in heated tank 70. Concentrate from the electrodeionization devices 30a and 30b was discharged through line 34.

During start up, water treatment system 200 was initially rinsed. Water to be treated was then diverted from tank 50 to feed line 12 via valve 16, and treated in two parallel lines. Line 1 consisted of RO units 20a and 20b and CEDI unit 30a. Line 2 consisted of RO units 20c and 20d and CEDI unit 30b. RO units 20a and 20c utilized a polyamide thin film composite membrane, Filmtec membrane Model HSRO-4040-FF, from The Dow Chemical Company (Midland, Mich.). RO units 20b and 20d utilized a composite membrane, SanRO-HS2, form Hydranautics (Oceanside, Calif.). The treated product water was stored in tank 70 and maintained at about 60° C.

Five intermittent short sanitation cycles were run. For each sanitization cycle, hot water from tank 10 was discharged through valve 16 into feed line 12 for delivery through treatment lines 1 and 2. The hot water exiting RO units 20a and 20b passed to CEDI unit 30a via line 22a. Similarly, hot water exiting RO units 20c and 20d passed to CEDI unit 30b via line 22b. Hot water was discharged from CEDI units 30a, 30b via line 34.

Figure 3:
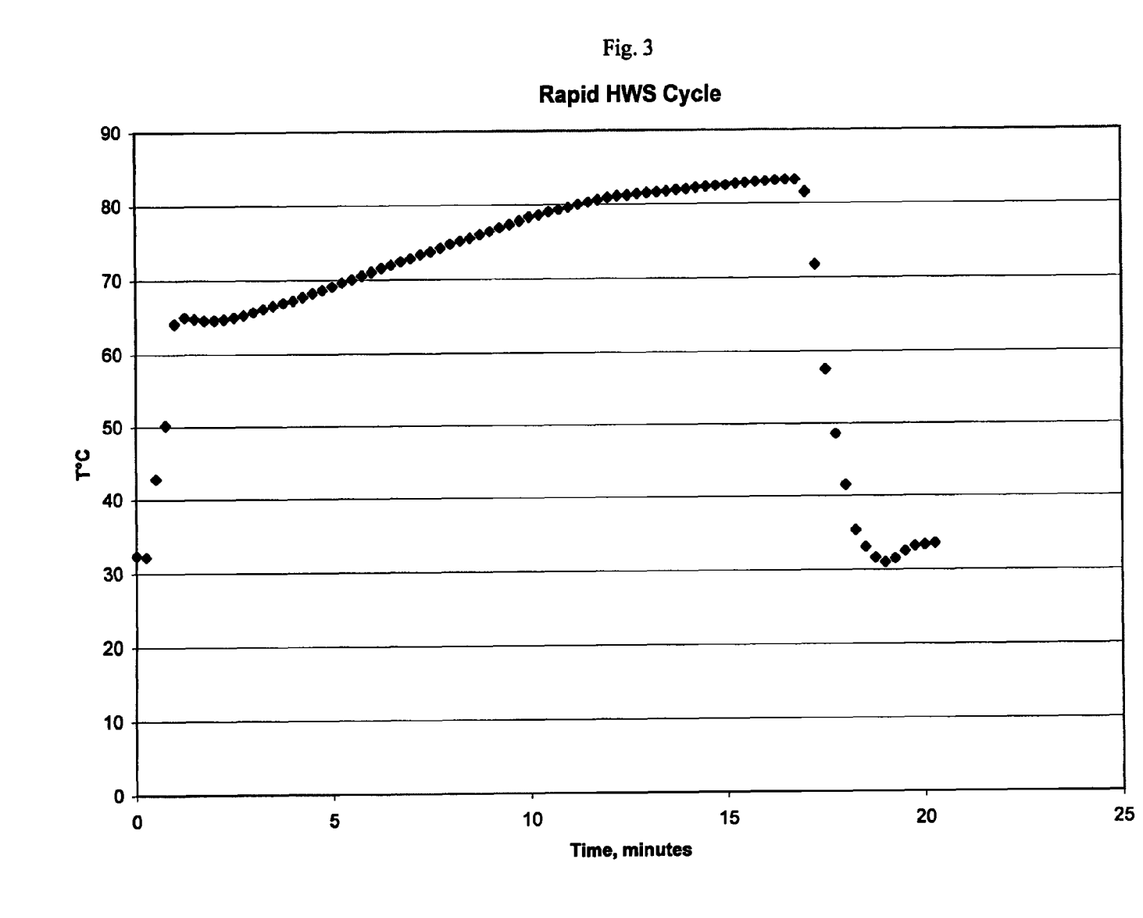
FIG. 3 is a graph showing a temperature profile of one embodiment of the invention.

The temperature of the hot water entering the RO units was monitored by a temperature sensor 36 positioned at a product outlet of line 1. FIG. 3 is a temperature profile of a 5 minute sanitization cycle with hot water at a temperature of about 80° C. In FIG. 3, the temperature of the water entering RO units 20a and 20b was monitored as the hot water was introduced into feed line 12. As seen in FIG. 3, the temperature of the water feed increased to about 80° C. in about 11 minutes and was maintained at a minimum temperature of about 80° C. for a sanitization period of time of 5 minutes after which time the feed of hot water was interrupted by valve 16. Ambient feed water at about 32° C. was then reintroduced to the system.

Water to be treated was then again diverted from tank 50 to feed line 12 via valve 16, and treated in RO units 20a-d and CEDI units 30a-b. The treated product water was stored in tank 70 maintained at about 60° C.

The hot water sanitization process was repeated 5 times over a period of 8 hours with the results below. Samples of feed water and product water were withdrawn from the system, incubated for 50-70 hours at 30° C. and analyzed with Millipore samplers MT0010025 available from Millipore Corp. (Billerica, Mass.). Results are shown in Table 1.

TABLE 1

| Line | Total Bacteria Count Prior to Sanitization cfu/mL | Total Bacteria Count After 2 Sanitizations cfu/mL | Total Bacteria Count After 5 Sanitizations cfu/mL |
| --- | --- | --- | --- |
| CEDI Feed, line 1 | 2 | 0 | 0 |
| CEDI Feed, line 2 | 4 | 0 | 0 |
| CEDI Product, line 1 | 4 | 1 | 1 |
| CEDI Product, line 2 | 9 | 0 | 0 |

As seen from Table 1, the Total Bacteria Count was significantly reduced after 2 short hot water sanitization cycles, and was maintained at that level after 5 short hot water sanitization cycles. The Total Bacteria Count was also well within established pharmaceutical guidelines. These results illustrate that intermittent short hot water cycles of about 4 minutes are effective for producing pharmaceutically acceptable water.

Example II

The system of Example 1 was run in a start/stop basis mode for a 3 week period with intermittent short hot water sanitization cycles of 5 minutes at a minimum temperature of 80° C. while also monitoring feed water conditions. The Heterotrophic Plate Count of the raw feed and treated water was measured using Analyzer MHPC10025 available from Millipore Corporation (Billerica, Mass.). Feed samples were taken at the end of week 2 from line 12 and incubated for 50 hours. Product samples were taken at the end of week 2 from line 32 and incubated for 52 hours. Results are show in Table 2.

TABLE 2

|  | Count Prior to Hot Water Sanitization cfu/mL | Count After Hot Water Sanitization cfu/mL |
|---|---|---|
| Heterotrophic Plate Count RO inlet (raw water) | >300 | >200 |
| Heterotrophic Plate Count CEDI product line 1 | 0 | 0 |
| Heterotrophic Plate Count CEDI product line 2 | 0 | 0 |

As seen from Table 2, intermittent short hot water sanitization cycles prevented an increase in Heterotrophic Plate Count and were effective in maintaining the treatment system well within established pharmaceutical guidelines. These results further illustrate that the additional time, energy costs and water use incurred with a typical recirculating water treatment system with a standard sanitization period of time of about 60 minutes may not be necessary.

Having thus described several aspects of at least one embodiment of this invention, it is to be appreciated various alterations, modifications, and improvements will readily occur to those skilled in the art. Such alterations, modifications, and improvements are intended to be part of this disclosure, and are intended to be within the spirit and scope of the invention. For example, it is contemplated that the water treatment system of the present invention may include, in addition to one or both of a RO unit and an electrodeionization unit, one or more additional water treatment units such as a hot water sanitizable activated carbon units, multi-media filters, softeners, micron filters and ultraviolet units. It is also contemplated that the intermittent short sanitization cycles may be performed on existing continuously recirculating systems. Accordingly, the foregoing description and drawings are by way of example only.

This invention is not limited in its application to the details of construction and the arrangement of components set forth in the following description or illustrated in the drawings. The invention is capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

What is claimed is:

1. A non-recirculating water treatment system comprising:
a treatment unit for removing dissolved species from a water stream;
a source of a sanitization fluid maintained at a temperature of about 60° C. to about 80° C.; and
a controller responsive to at least one of an operational startup of the treatment unit, an operational shutdown of the treatment unit, a pre-determined time period of in-service operation of the treatment unit, a pre-determined out of service time period of the treatment unit, and microbial count;
wherein the controller is in communication with an inlet of the treatment unit and is configured to intermittently generate a control signal that adjusts an amount of flow of the sanitization fluid to the inlet for a period of time from about 1 minute to about 5 minutes, and further configured to provide a treated water stream having less than 100 colony forming units per milliliter.

2. The water treatment system of claim 1, wherein the sanitization fluid is water.

3. The water treatment system of claim 1, wherein the treatment unit is selected from the group consisting of a RO unit, an electrodeionization unit, and combinations thereof.

4. The water treatment system of claim 3, wherein the treatment unit is a reverse osmosis unit.

5. The water treatment system of claim 3, wherein the treatment unit is an electrodeionization unit.

6. The water treatment system of claim 1, wherein the water treatment system is an ambient water treatment system.

7. The water treatment system of claim 1, wherein the predetermined time period is between about 1 hour and about 8 hours.

8. The water treatment system of claim 1, further comprising a sanitization fluid tank.

9. The water treatment system of claim 1, further comprising a heat exchanger positioned upstream of the inlet.

10. The water treatment system of claim 9, wherein the controller generates a control signal to deliver the sanitization fluid to the inlet of a period of time sufficient to sanitize the system.

11. The water treatment system of claim 10, wherein controller generates a control signal to deliver the sanitization fluid to the inlet for a period of time of about 5 minutes.

12. The water treatment system of claim 10, wherein the controller generates a control signal to deliver the sanitization fluid to the inlet for a period of time from about 1.5 minutes to about 4 minutes.

13. The water treatment system of claim 12, wherein the controller generates a control signal to deliver the sanitization fluid to the inlet for about 2 minutes.

14. The water treatment system of claim 1, wherein the controller generates a plurality of control signals daily that adjusts the amount of flow of the sanitization fluid to the inlet.

15. The water treatment system of claim 14, wherein the controller generates from about 2 to about 8 control signals daily to deliver sanitization fluid to the inlet of the treatment unit.

16. A water treatment system comprising:
a treatment unit for removing dissolved species from a water stream;
a source of a sanitization fluid maintained at a pharmaceutically acceptable sanitization temperature;
a heating system constructed and arranged to maintain the source of sanitization fluid at a pharmaceutically acceptable sanitization temperature; and
means for intermittent daily delivery of the sanitization fluid for a period of time from about 1 minute to about 5 minutes to an inlet of the treatment unit to provide a treated water stream having less than 100 colony forming units per milliliter.

17. The non-recirculating water treatment system of claim 16, wherein the source of the sanitization fluid is maintained at a temperature of about 85° C.

18. The water treatment system of claim 16, wherein the treatment unit is selected from the group consisting of a reverse osmosis unit, an electrodeionization device, and combinations thereof.

19. The water treatment system of claim 18, wherein the means for intermittent daily delivery of the sanitization fluid comprises means for providing water at a pharmaceutically acceptable sanitization temperature to the treatment unit.

20. A method of controlling a population growth of microorganisms in a water treatment unit comprising:
   providing a treatment unit for removing dissolved species from a water stream;
   providing a source of a sanitization fluid fluidly connected to the treatment unit and a heating system constructed and arranged to maintain the temperature of the source of sanitization fluid from between about 60° C. and about 80° C.;
   generating at least one signal based on an operational startup of the treatment unit, an operational shutdown of the treatment unit, a pre-determined time period of in-service operation of the treatment unit, a pre-determined out of service time period of the treatment unit, and microbial count; and
   intermittently providing the sanitization fluid at a temperature ranging from between about 60° C. and about 80° C. to an inlet of the treatment unit for a period of time ranging from about 1 minute to about 5 minutes in response to the at least one signal to provide a treated water stream having less than 100 colony forming units per milliliter.

21. The method of claim 20, wherein providing a treatment unit comprises providing at least one of a reverse osmosis unit and an electrodeionization device.

22. The method of claim 20, wherein providing a source of a sanitization fluid comprises providing.

23. The method of claim 20, wherein providing a source of the sanitization fluid comprises delivering water to the inlet for a period of time ranging from about 1.5 minutes to about 4 minutes.

24. A water treatment system comprising:
   a treatment unit for removing dissolved species from a water stream;
   a source of a sanitization fluid maintained at a temperature of about 60° C. to about 80° C.; and
   a controller responsive to at least one of an operational startup of the treatment unit, an operational shutdown of the treatment unit, a pre-determined time period of in-service operation of the treatment unit, a pre-determined our of service time period of the treatment unit, and microbial count;
   wherein the controller is in communication with an inlet of the treatment unit and is configured to intermittently generate a plurality of control signals daily that adjusts an amount of flow of the sanitization fluid at a temperature of between about 60° C. and about 80° C. to the inlet for a period of time from about 1 minute to about 5 minutes to provide a treated water stream having less than 100 colony forming units per milliliter.

25. The water treatment system of claim 24, wherein the water treatment system is a non-recirculating water treatment system.

* * * * *